Sept. 20, 1971     R. D. CHAPIN     3,606,157
SUSPENSION SPRAY SYSTEM
Filed Aug. 4, 1969     2 Sheets-Sheet 1
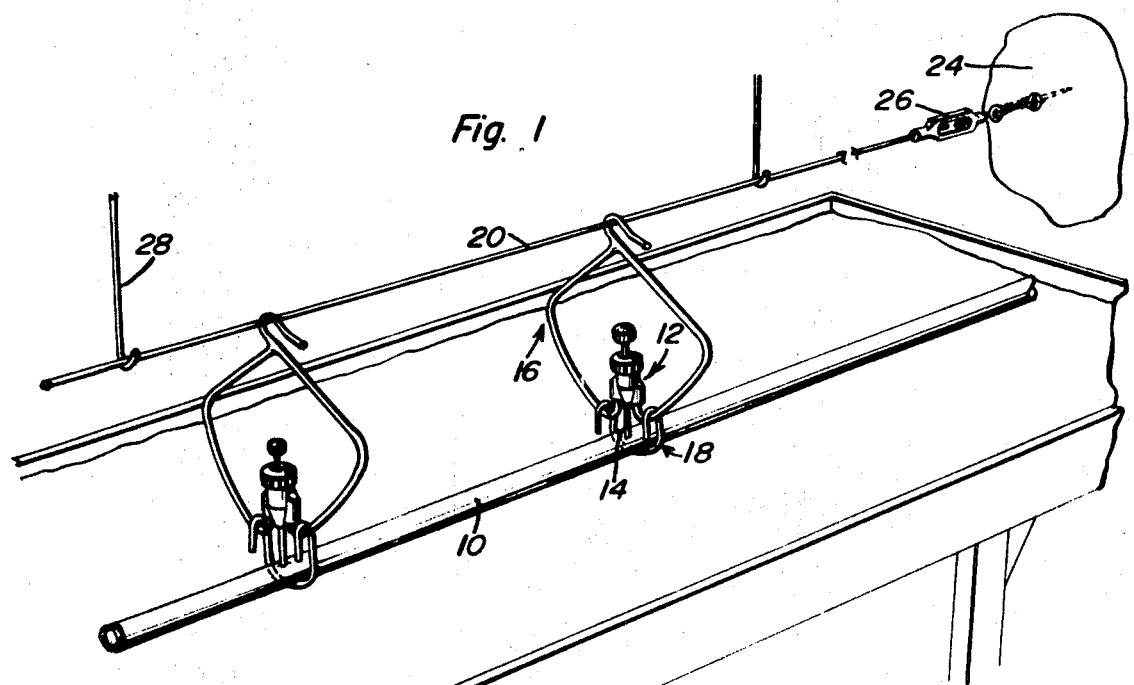
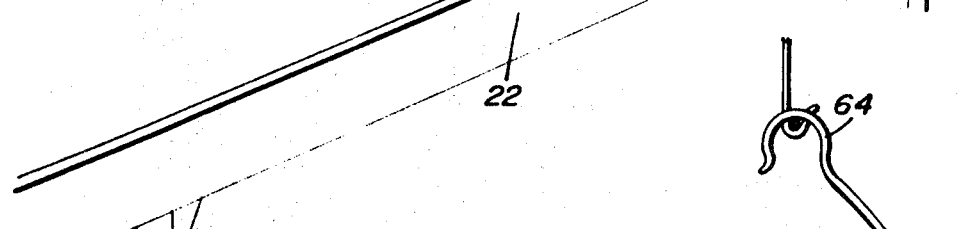
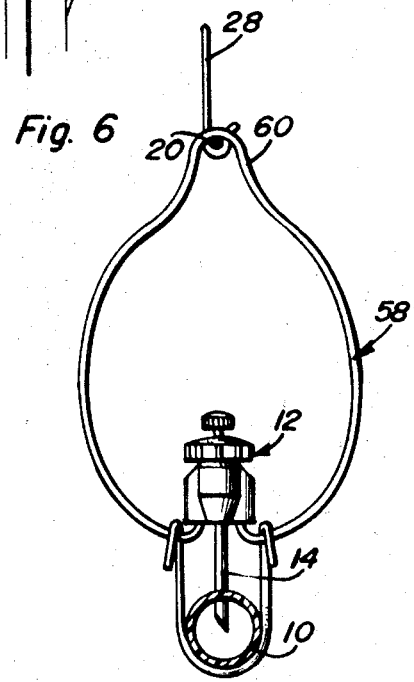
Richard D. Chapin
INVENTOR.

Sept. 20, 1971 R. D. CHAPIN 3,606,157

SUSPENSION SPRAY SYSTEM

Filed Aug. 4, 1969 2 Sheets-Sheet 2

Richard D. Chapin
INVENTOR.

BY
Attorneys

United States Patent Office 3,606,157
Patented Sept. 20, 1971

3,606,157
SUSPENSION SPRAY SYSTEM
Richard D. Chapin, 368 N. Colorado Ave.,
Watertown, N.Y. 13601
Filed Aug. 4, 1969, Ser. No. 847,210
Int. Cl. B05b *15/02*
U.S. Cl. 239—118    12 Claims

ABSTRACT OF THE DISCLOSURE

A watering system for long runs consisting of an elongated water supplying main suspended horizontally in an elevated position from a tensioned suspension cable by means of a series of hangers engaged with the suspension cable and movement accommodating supports engaged between the main and the hangers. The main is provided with a series of upstanding spray nozzles connected thereto by flow restricting small diameter connecting or supply tubes, each nozzle being directly engaged with and supported by a hanger independently of the main whereby a proper vertical orientation of the nozzles will be maintained regardless of slight movements in the main itself.

---

The instant invention is generally concerned with the distribution of water over long runs in an even, a thorough, and an economical manner. More specifically, the invention herein is concerned with a spray system consisting of an elongated flexible water main suspended, normally over a greenhouse bench or the like, from a tensioned cable and incorporating upright communicating nozzles independently engaged with the hangers which, through movable supports, also suspend the water main from the tensioned suspension cable.

It is a primary object of the instant invention to provide a spray system for greenhouse benches and the like which significantly improves on the more conventional spray systems wherein a bench supported rigid main is utilized in conjunction with upstanding rigidly mounted spray nozzles. As will be appreciated, the conventional rigid system requires substantial care in aligning the nozzles and maintaining the alignment of the nozzles so as to properly and uniformly direct the spray, this in turn often requiring an elaborate supporting framework to avoid any misorientation of the main pipe and nozzles thereon.

As one manner of avoiding the problems associated with a more conventional spray system, applicant has devised the unique system set forth herein. This system incorporates a high degree of flexibility and adaptability through the utilization of not only flexible tubes, but also a suspension system wherein a tensioned suspension cable is used to support an elongated run of a flexible water supplying main which is communicated, through flexible supply tubes, with a series of nozzles also supported directly from the suspension cable by unique hangers. The system, thus formed, is inexpensive, highly practical, and easily adaptable to differing conditions, requiring primarily, in addition of course to a source of pressurized water, only means for positioning and tensioning a suspension cable over the particular area to be sprayed. The water supplying main is preferably of polyethylene, as are the supply tubes which are frictionally engaged through the main at one end and the nozzles at the other end. The flexible nature of the supply tubes enables a shifting of the main while at the same time maintaining the desired vertical orientation of the nozzles through the relatively independent support of the nozzles from the associated hangers, these same hangers also supporting the main itself through independent movement accommodating wire supports.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a portion of a greenhouse bench with the system of the instant invention mounted thereover;

FIGS. 6 and 7 are elevational views similar to FIG. 2 illustrating modified forms of hangers.

Figure 2:
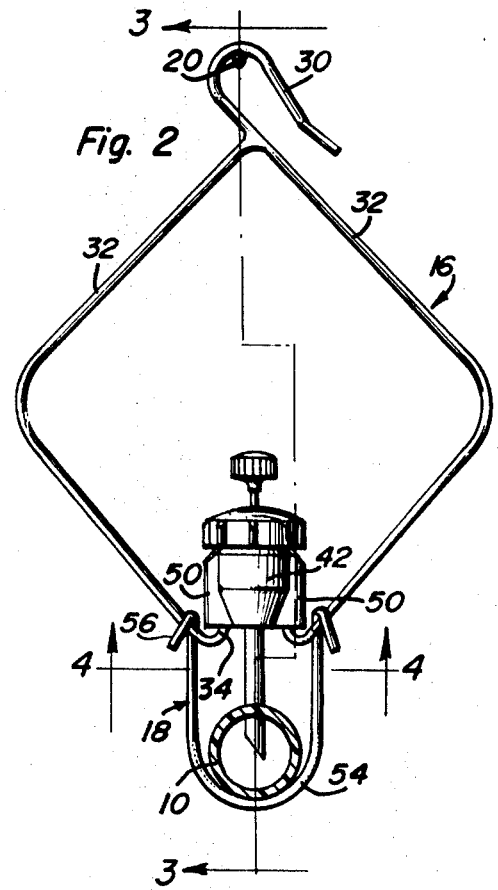
FIG. 2 is an enlarged cross-sectional view through the system illustrating the support cable and water main in cross-section and the remaining components in elevation.
Figure 4:
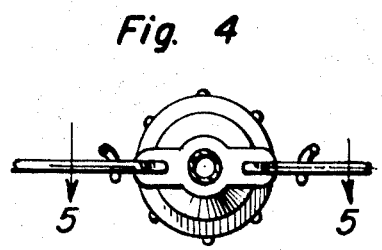
FIG. 4 is a cross-sectional view taken substantially on a plane passing along line 4—4 in FIG. 2.
Figure 5:
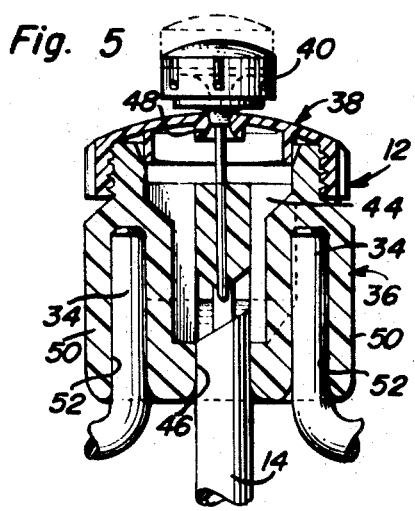
FIG. 5 is a cross-sectional view taken substantially on a plane passing along line 5—5 in FIG. 4.
Figure 3:
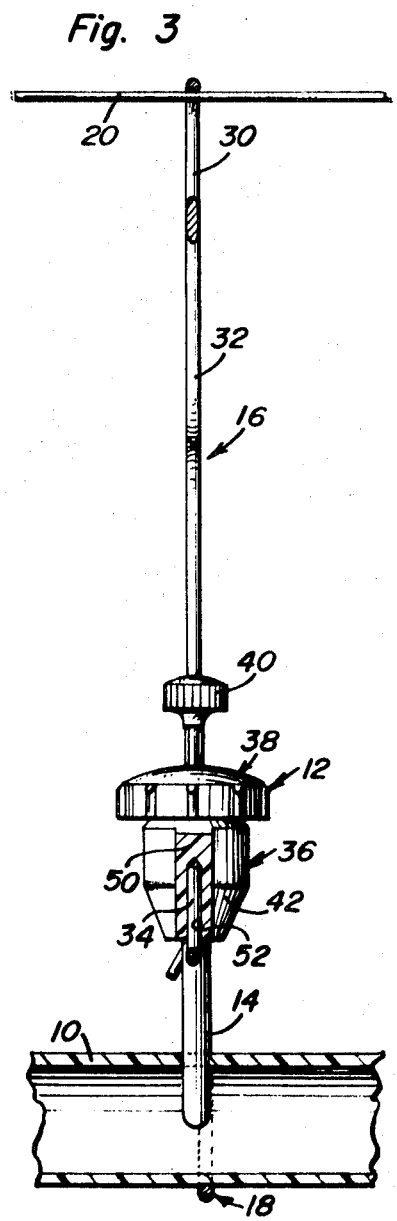
FIG. 3 is an enlarged cross-sectional view taken substantially on a plane passing along line 3—3 in FIG. 2.

Referring now more specifically to the drawings, the system of the instant invention basically includes an elongated water supplying main 10, a plurality of nozzles 12 vertically above the main 10 and communicated therewith by relatively short reduced diameter flexible supply lines 14, a series of wire-like hangers 16 directly engaged with and supporting the nozzles 12, wire-like supports 18 suspending the main 10 from the hangers 16, and a tensioned overhead suspension cable 20 with which the hangers 16 are engaged.

The water main 10, as well as the individual supply tubes 14 which are of a substantially reduced diameter relative to the main 10 so as to in effect meter the flow of water to the nozzles 12, are made of an appropriate slightly flexible plastic material such as polyethylene. The actual connection of each supply tube 14 to the main 10 is effected by merely punching a hole through the wall of the main 10 of a diameter slightly less than the external diameter of the supply tube 14 and forcing the beveled end of the supply tube 14 through the punched hole in the main 10. The slightly resilient nature of both the main 10 and the supply tube 14 insures a firm frictional gripping of the inserted end of the supply tube 14.

The suspension cable 20 is orientated longitudinally over the area, for example a greenhouse bench 22, which is to be accommodated by the spray system, the opposite ends of the cable 20 being engaged with fixed posts, walls, or the like, generally indicated by reference numeral 24. Further, in order to insure a proper tensioning of the cable 20, appropriate tensioning means, such as the illustrated turnbuckle 26, can be incorporated into the cable 20. Likewise, particularly when long runs are involved, appropriate suspension wires 28 can support intermediate portions of the suspension cable 20 from an overhead support, normally the roof of the greenhouse.

A series of hangers 16 are provided along the length of the suspension cable 20, corresponding in number to the number of nozzles 12 provided. Each of these hangers 16 includes an elongated cable-engaging hook 30 which opens downwardly at approximately a 45 degree angle, thus allowing it to be easily introduced over the suspension cable 20. Below the hook 30 each hanger 16, which is incidentally formed of relatively rigid heavy wire, consists of two legs 32 which diverge downwardly at approximately 90 degrees to each other, one of these legs 32 actually constituting a linear continuation of one side of the hook 30. At approximately mid-height, each of the legs 32 turns inwardly at approximately a 90 degree angle whereby the lower portion of the legs 32 converge downwardly toward each other terminating, at the lower ends thereof, in upwardly directed vertical end portions 34 orientated in vertical alignment with the hook 30, these upturned end portions 34 being spaced from each other for the accommodation of the corresponding nozzle 12 thereon as shall be explained subsequently.

The nozzles 12, which are specifically detailed in applicant's copending application Ser. No. 832,145, filed June 11, 1969, each consists basically of a one piece plastic body 36, formed of polyethylene or the like, a removable plastic cap 38, and an adjustable diffuser head 40. The main body 36 includes an enlarged generally cylindrical central section 42 which defines an enlarged upwardly directed internal chamber 44 opening through the upper end of the body 36. The bottom of the central portion 42 is provided with a central aperture 46 communicating directly with the interior chamber 44 and of a size so as to frictionally receive and retain the upper end portion of an associated supply tube 14. In this manner, water from the main 10, with which the lower portion of the corresponding supply tube 14 is communicated by frictional engagement through a hole punched in the main 10, is supplied directly to the outwardly opening nozzle chamber 44. This water passes through a central discharge opening 48 vertically through the cap 38 for engagement against and outward diffusion by the diffuser head 40, the cap 38 itself being threaded on the upper end of the nozzle body 36.

Extending outwardly in diametrically opposed orientation on the central body section 42 are a pair of cylindrical wing portions 50. Each of these wing portions includes a downwardly directed elongated vertical blind bore 52. These bores 52 snugly receive and frictionally retain the upturned end portions of the two hanger legs 32, thus vertically orientating the nozzle within the corresponding hanger 16 for a suspension thereof from the suspension cable 20. The nozzle, mounted in this manner, has the diffuser head 40 located centrally within the corresponding hanger 16 at approximately the widest point thereof whereby substantially no interference with the spray pattern occurs. It would also be recognized that the mounting of the nozzle interlocks and rigidifies the lower ends of the hanger legs 32.

The water supplying main 10, engaged with each of the nozzles 12 by a short length of reduced diameter flexible supply tubing 14, exerts a slight downward pressure on the nozzles 12 whereby the nozzles 12 are maintained in a straight vertical position even though there might be some misalignment in the supply tube receiving holes formed in the main 10 itself. Further, even were the main 10 to twist slightly, the flexible supply or connecting tubes 14 can accommodate a limited degree of flexing, thus enabling a retention of the desired upright position for the nozzles.

The primary support for the water supplying main consists of the wire-like support 18 associated with each hanger 16. Each of these supports 18 consists of a central U-shaped portion 54 underlying the main 10 and forming in effect a seat for the main 10. The upper end portions 56 of the legs of the U-shaped central portion 54 are reversely bent over the lower portions of the hanger legs 32 just inward of the upwardly directed end portions 34 of these hanger legs 32. In this manner, each of the wire supports 18 forms in effect a saddle for the support of the main 10. As will be appreciated, the supports 18 are loosely engaged with the hangers 16 whereby slight movements of the main 10 can be accommodated without misorientating the entire system. Incidentally, the main 10 should also be slightly tensioned so as to insure a proper suspension thereof. This of course can be accomplished in any suitable manner. For example, the end of the main 10 opposite from the end secured to the source of pressurized water can be clamped to a portion of the cable supporting structure 24. An appropriate spring tensioning device can also be used.

FIG. 6 is of interest in illustrating a modified form of hanger 58. This hanger 58 consists of a continuous length of wire, the central portion of which is formed into a reduced diameter upwardly directed loop 60 which engages over the suspension cable 20. The two extreme ends of the hanger 58 are orientated vertically below the reduced diameter loop 60 and are upwardly directed for reception within the bores 52 of a nozzle 12, in the same manner as the upturned ends 34 of the hanger 16. The hanger 58, between the loop portion 60 and the upturned ends is outwardly bowed so as to accommodate the nozzle 12 and not interfere with the spray pattern produced thereby.

FIG. 7 illustrates yet another form of hanger 62, also formed of a one piece length of wire. In the case of the hanger 62, one end of the wire is formed into a cable engaging downwardly directed hook 64, while the second end portion is formed so as to define a nozzle encircling loop 66 with a projecting slightly upturned extreme end portion 68. The loop 66 encircles the nozzle 12 immediately below the cap 38 and provides a seat for this cap, thereby supporting the nozzle. The support wire 18 engages over the projecting end portion 68 of the hanger 62, as well as over the hanger 62 to the opposite side of the nozzle supporting loop 66. As will be appreciated from the drawings, the nozzle supporting loop 66 is orientated vertically below the hook 64 whereby the vertical orientation of the nozzle 12 is maintained.

In actual use, the main 10 consists of a length of polyethylene tubing, normally ¾" or 1" in diameter, provided with connector means at one end thereof for engagement with a source of pressurized water. This slightly flexible tube has a series of small diameter holes punched along the length thereof for the frictional reception of the first end of a series of reduced diameter feeder or nozzle supplying tubes 14. The holes in the main 10 can, as one example, be provided at 40" spacing so as to result in a spray pattern wherein a full overlap occurs utilizing a conventional pressure source. Further, in view of the flexible nature of the feeder tubes 14, the holes in the main 10 need not be exactly aligned, the nozzles, through the suspension hanger 16, being properly vertically orientated regardless of any slight variance in the angle at which the corresponding feeder tubes enter the main 10.

The utilization of feeder tubes 14 of a substantially reduced diameter relative to the main 10 is of significance in that these tubes act so as to monitor the pressure within the main 10 and introduce only such a flow of water to the nozzles 12 as can be effectively distributed by the nozzles. This metering of the water directly at the main rather than at the nozzles results in the maintenance of the pressure within the main at a fairly constant level throughout extremely long runs, thereby adapting the system for normal pressures and resulting in a substantial conservation of water. Were, on the contrary, large diameter supply tubes utilized, the pressure drop along the length of the main 10 would be substantial, notwithstanding a monitoring of the flow directly at the nozzle itself. The supply tubes herein, normally having an internal flow passage on the order of ⅛" in diameter, supply to the corresponding nozzles only that portion of the pressurized flow which can be properly distributed by the particular nozzles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a spray system for plants and the like, an elongated water main, a plurality of supply tubes positioned at spaced points along said water main, each supply tube having first and second ends, the first end of each supply tube being in flow receiving communication with said water main, a nozzle fixed to the second end of each supply tube in flow receiving communication therewith for an outward spraying of the received flow, a plurality of hangers at spaced points along said main, one hanger substantially coincident with each nozzle, each hanger including means for suspended engagement with an overhead support and means for supporting engagement with the adjacent nozzle, and support means engageable between each hanger and the adjoining portion of the main for a support of the main from the hanger generally independent of the nozzle, each nozzle including a pair of downwardly directed bores, the means on said hanger for engaging and supporting the nozzle comprising a pair of upwardly directed free ends frictionally received within the downwardly directed nozzle bores.

2. The system of claim 1 including an elongated tensioned suspension cable generally paralleling said main in vertically spaced relation thereabove, said cable constituting the overhead support from which the hangers are suspended.

3. The system of claim 2 wherein each hanger is of wire-like construction, said means for engagement with an overhead support comprising a cable overlying loop-like portion at the upper end of said hanger, said means for engaging and supporting a nozzle being defined at the bottom of the hanger, the nozzle being supported between the upper and lower extremities of the corresponding hanger with the hanger, between the upper and lower extremities, being outwardly enlarged away from the nozzle.

4. The system of claim 3 wherein each support means comprises an elongated wire-like member underlying the water main and having the opposed ends thereof engaged with the corresponding hanger adjacent the nozzle.

5. The system of claim 4 wherein each support means is movable relative to the corresponding hanger whereby relative movement of the supported water main is possible.

6. In a spray system for plants and the like, an elongated water main, a plurality of supply tubes positioned at spaced points along said water main, each supply tube having first and second ends, the first end of each supply tube being in flow receiving communication with said water main, a nozzle fixed to the second end of each supply tube in flow receiving communication therewith for an outward spraying of the received flow, a plurality of hangers at spaced points along said main, one hanger substantially coincident with each nozzle, each hanger including means for suspended engagement with an overhead support and means for supporting engagement with the adjacent nozzle, support means engageable between each hanger and the adjoining portion of the main for a support of the main from the hanger generally independent of the nozzle and an elongated tensioned suspension cable generally paralleling said main in vertically spaced relation thereabove, said cable constituting the overhead support from which the hangers are suspended, each support means comprising an elongated wire-like member underlying the water main and having the opposed ends thereof engaged with the corresponding hanger adjacent the nozzle.

7. The system of claim 6 wherein each of said supply tubes is of a substantially reduced diameter relative to the water main whereby an automatic metering of the flow of water therethrough to the associated nozzle is effected.

8. In a spray system for plants and the like, an elongated water main, a plurality of supply tubes positioned at spaced points along said water main, each supply tube having first and second ends, the first end of each supply tube being in flow receiving communication with said water main, a nozzle fixed to the second end of each supply tube in flow receiving communication therewith for an outward spraying of the received flow, a plurality of hangers at spaced points along said main, one hanger substantially coincident with each nozzle, each hanger including means for suspended engagement with an overhead support and means for supporting engagement with the adjacent nozzle, and support means engageable between each hanger and the adjoining portion of the main for a support of the main from the hanger generally independent of the nozzle, each hanger being of wire-like construction, said means for engagement with an overhead support comprising a cable overlying loop-like portion at the upper end of said hanger, said means for engaging and supporting a nozzle being defined at the bottom of the hanger, the nozzle being supported between the upper and lower extremities of the corresponding hanger with the hanger, between the upper and lower extremities, being outwardly away from the nozzle.

9. The system of claim 8 wherein each support means comprises an elongated wire-like member underlying the water main and having the opposed ends thereof engaged with the corresponding hanger adjacent the nozzle.

10. A suspension watering system for the watering of nursery stock or the like comprising an overhead support overlying the area to be watered in vertically spaced relation thereabove, a series of hangers suspended from said support at spaced points therealong, a vertically orientated water discharging nozzle engaged with and supported by each hanger, an elongated water main extending along said support and supported in spaced relation therebelow by said hangers, and a plurality of supply tubes, one communicating each nozzle with the main, each supply tube being of a substantially reduced diameter relative to the main.

11. The system of claim 10 wherein each of said supply tubes is flexible, said water main being movably engaged with said hanger.

12. The system of claim 11 including a wire-like support depending from each hanger and engaging said water main for a support of the water main therefrom, each wire-like support encircling both the water main and a portion of the associated hanger in a manner whereby movement of the water main relative to the hanger is provided for.

References Cited

UNITED STATES PATENTS

| | | | |
|---|---|---|---|
| 762,014 | 6/1904 | Wittbold | 239—209X |
| 1,288,122 | 12/1918 | Mowry. | |
| 2,265,810 | 12/1941 | Lowe et al. | 169—16 |
| 2,879,945 | 3/1959 | Johnson | 239—547X |

FOREIGN PATENTS

| | | | |
|---|---|---|---|
| 10,128 | 4/1911 | Great Britain | 248—61 |

M. HENSON WOOD, Jr., Primary Examiner

M. MAR, Assistant Examiner

U.S. Cl. X.R.

239—272, 283, 542, 547, 550; 248—61